Sept. 16, 1969   KARL-HEINZ HOLDERBAUM   3,466,994

OPTICAL OBJECTIVE WITH OPTIONAL DIAPHRAGM PRESELECTOR

Filed May 24, 1967

Karl-Heinz Holderbaum
Inventor.

By Karl G. Ross
Attorney

United States Patent Office

3,466,994
Patented Sept. 16, 1969

3,466,994
OPTICAL OBJECTIVE WITH OPTIONAL DIAPHRAGM PRESELECTOR
Karl-Heinz Holderbaum, Bad Kreuznach, Germany, assignor to Jos. Schneider & Co., a corporation of Germany
Filed May 24, 1967, Ser. No. 640,984
Claims priority, application Germany, June 23, 1966, Sch 39,159
Int. Cl. G03b 9/02
U.S. Cl. 95—64                                               7 Claims

ABSTRACT OF THE DISCLOSURE

Optical objective with a housing having a cutout through which a lug of a diaphragm-control ring projects outwardly into engagement with an external setting ring. The lug is urged by a spring force toward one end of the cutout from which it can be removed by an abutment on the setting ring upon rotation of the latter into any of several indexed "manual" stop positions. Another abutment on the setting ring, whose spacing from the first abutment equals or exceeds the maximum angle of rotation of the control ring, is engageable by the lug upon rotation of the setting ring into any of several indexed "automatic" stop positions—on a common circle with the "manual" stop positions—to limit rotation of the control ring in response to actuation of an operating element (e.g. a release button also serving to trip an associated camera shutter) which tends to displace the lug against its spring force.

---

My present invention relates to an optical camera objective with an adjustable diaphragm wherein, e.g. as shown in commonly owned U.S. Patent Nos. 2,965,012 and 2,981,169 to K. H. Schütz, means are provided for preselecting a stop position while allowing the diaphragm to remain in an extreme (generally wide-open) position, for focusing purposes, up to the very instant when a picture is to be taken.

In such systems it is, however, sometimes desirable to suppress this preselecting feature and to provide for direct manual selection of a diaphragm stop, as distinct from the automatic movement of a diaphragm to a preselected position during the tripping of an associated shutter, e.g. for the purpose of visually ascertaining depth of field during focusing with the aid of a ground-glass plate. Heretofore, such temporary deactivation of a preselector required relatively complex mechanism some of whose elements had to traverse perforations in the diaphragm housing through which dust could penetrate into the interior of the objective.

It is, theerfore, the general object of my present invention to provide a simplified diaphragm-control system with optional preselection which avoids the aforestated disadvantages.

This object is realized, pursuant to my present invention, by the provision of a rotatable setting ring on a generally cylindrical objective housing, this ring being provided with two peripherally spaced abutments for a lug projecting outwardly from a diaphragm-control ring through a peripheral cutout in the housing for rotary entrainment by one of these abutments against the force of a biasing spring tending to hold the lug against an end of its cutout. With "manual" operation, the abutment referred to overlies the cutout in any of several operating positions in which the setting ring is indexable; for "automatic" operation, the setting ring is indexed in any one of a set of other operating positions in which the first abutment clears the cutout whereas the second abutment registers therewith to arrest the lug in its preselected position as soon as a shutter-release button or other operating element is actuated to rotate the control ring against its biasing force. Advantageously, the two groups of "manual" and "automatic" stop positions lie on adjoining arcuate segments of a common circle, the arc length of each segment being substantially equal to the range of operative rotation of the control ring which may also be the same as the length of the peripheral cutout of the housing. In such case the spacing of the two abutments will likewise be about equal to the operative range, though in the more general case this spacing may be greater than that range.

The invention will be described in greater detail hereinafter with reference to the accompanying drawing in which.

Figure 1:
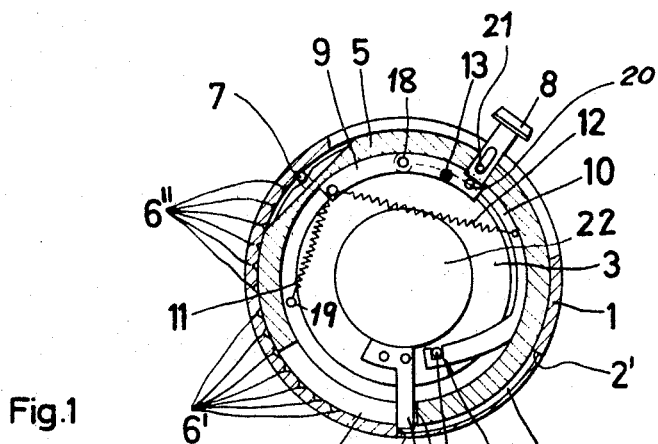
FIG. 1 is a cross-sectional view of an objective housing equipped with diaphragm-control means in accordance with my invention.

The objective shown in the drawing comprises a cylindrical housing 5 provided with a peripheral cutout 17 extending here over approximately 60°. A lug 4, rigid with a control ring 3 for the iris leaves 16 of a conventional diaphragm, projects outwardly through a cutout 17 into a recess 2 on the inner peripheral surface of a setting ring 1 rotatably embracing the housing 5. Recess 2 is bounded by edges 2' and 2" constituting respective abutments for the lug 4.

Figure 2:
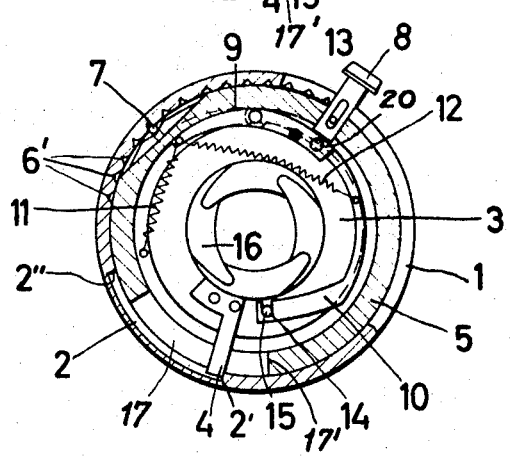
FIG. 2 is a view similar to FIG. 1, showing the elements in an alternate position.
Figure 3:
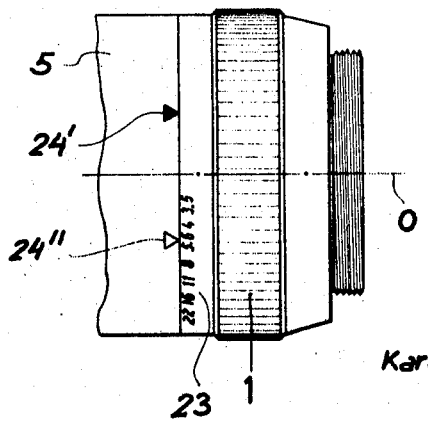
FIG. 3 is a fragmentary side-elevational view of the objective.

One of the two contact surfaces of the ring 1 and housing 5, here the inner surface of the ring, is formed with two groups of indentations 6', 6" extending each, as does cutout 17, over substantially the same aforementioned angle of 60°. A spring-loaded detent 7, shown as a ball, is positioned for selective entry into any of these indentations to index the ring 1 in any one of seven "manual" positions (indentations 6') or as many "automatic" positions (indentations 6"), as respectively illustrated in FIGS. 2 and 1. As shown cutout 17 is overlain by the abutment 2' in the "manual" positions of ring 1 (FIG. 2) and by abutment 2" in the "automatic" positions (FIG. 1).

Pivoted on a fixed pin 18 within housing 5 are a pair of levers 9 and 10. Two-armed lever 9 is under tension from a spring 11 which is anchored at 19 to the housing and tends to rotate this lever counterclockwise about its fulcrum. One-armed lever 10 is urged by a spring 12, anchored to both levers, against a stud 13 on lever 9 so as to move conjointly with the latter; the remote end of lever 10 has a slot 14 slidably receiving a pin 15 on diaphragm-control ring 3. Another pin 20 on lever 9 is engageable by a pushbutton 8, guided for radial motion in housing 5 with the aid of a retaining pin 21, which may be part of a tripping mechanism for a shutter (not shown) juxtaposed with diaphragm 16 or separated therefrom by one or more of the lenses of the objective of which one is visible at 22.

Spring 12 is relatively weak, compared with spring 11, so that the latter is effective in holding the lug 4 either against the end 17' of cutout 17 or against the abutment 2' of recess 2, depending on whether ring 1 is indexed for automatic or manual operation, as long as pushbutton 8 is not depressed. With manual operation (FIG. 2) abutment 2' maintains the lug 4 spaced from end 17' to an extent determined by the setting of ring 1 as read on a scale 23 on ring 1 with the aid of a mark 24' on housing 5; with automatic operation, a diaphragm stop is preselected by means of the same scale 23 as read with the aid of a mark 24" on housing 5. It will be understood that either the marks 24', 24", as shown, or the scale 23 may be duplicated at peripherally spaced locations to give corresponding readings of identical diaphragm positions for both manual and automatic operation. When the ring 1 has been set to preselect a diaphragm stop as illustrated in FIG. 1, spring 11 keeps the lugs 4 in contact with end 17' of cutout 17 to maintain the diaphragm 16 in its wide-open position; when the pushbutton 8 is subsequently depressed, against the force of spring 11 and to the extent permitted by abutment 2″, the diaphragm aperture is reduced to the desired extent. Thus, the position of ring 1 illustrated in FIG. 1 corresponds to maximum diaphragm aperture (e.g. 1:3.5), with virtually no movement of lug 4 from its rest position to its preselected stop position. Housing 5 is suitably recessed to accommodate the lever 9 in its deflected position illustrated in FIG. 2.

I claim:

1. In an optical objective having a generally cylindrical housing with a peripheral cutout and a diaphragm-control ring rotatably mounted in said housing, said control ring having a lug projecting outwardly through said cutout, the combination therewith of a setting ring rotatably mounted on said housing, a first and a second abutment on said setting ring coacting with said lug, said abutments being peripherally separated by a distance at least equal to the range of operative rotation of said control ring, spring means urging said lug toward an end of said cutout, first indexing means defining a set of first operating positions for said setting ring in which said first abutment holds said lug spaced from said end against the force of said spring means, second indexing means defining a set of second operating positions for said setting ring in which said first abutment clears said cutout while said second abutment overlies said cutout to limit the swing of said lug therein, and operating means actuatable to displace said control ring into a limiting position defined by the engagement of said lug with said second abutment.

2. The combination defined in claim 1 wherein said abutments are limits of an inner peripheral recess in said setting ring.

3. The combination defined in claim 1 wherein said setting ring and said housing have contact surfaces provided with said first and second indexing means.

4. The combination defined in claim 3 wherein said first and second indexing means include a resilient detent on one of said contact surfaces selectively engageable in a first and a second group of indentations on the other of said surfaces, said groups of indentations lying on a common circle.

5. The combination defined in claim 4 wherein said first and second groups of indentations occupy adjoining arcuate segments each extending over an arc substantially equal to said range of operative rotation.

6. The combination defined in claim 5 wherein said housing and said setting ring are externally provided with cooperating markings indicating different diaphragm stops, said markings being duplicated at peripherally spaced locations for said first and second groups of indentations.

7. The combination defined in claim 1 wherein said operating means includes a radially movable button projecting from said housing and lever means in said housing displaceable by said button, said spring means being anchored to said lever means.

References Cited

UNITED STATES PATENTS

| 2,967,472 | 1/1961 | Gebele. |
| 3,143,945 | 8/1964 | Ludwig et al. |
| 3,165,997 | 1/1965 | Sugano et al. |
| 3,308,735 | 3/1967 | Spiesse _____ 95—64 |

NORTON ANSHER, Primary Examiner

JOSEPH F. PETERS, Jr., Assistant Examiner